UNITED STATES PATENT OFFICE.

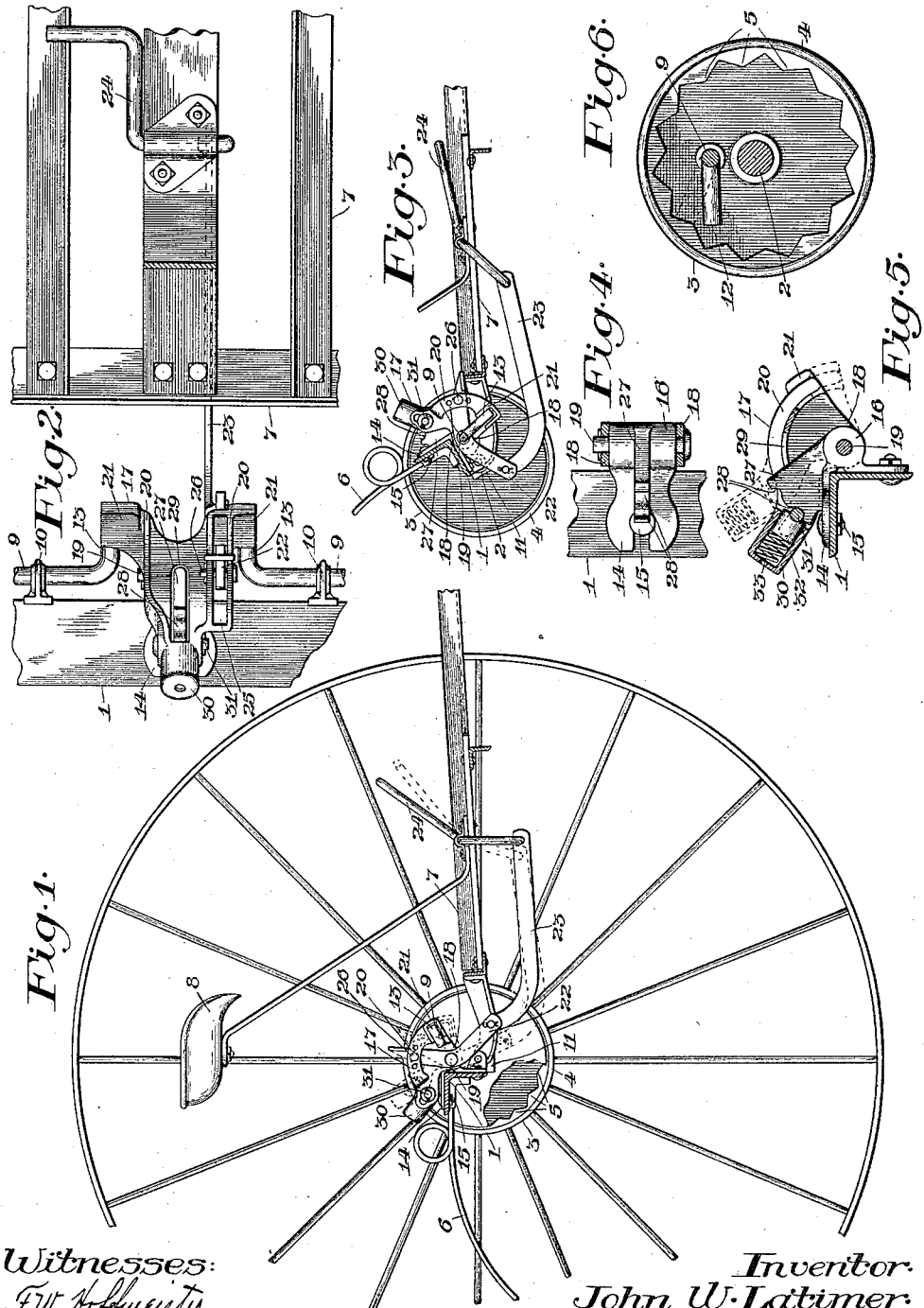
J. W. LATIMER.
HAY RAKE.
APPLICATION FILED JULY 3, 1911.
1,009,156.
Patented Nov. 21, 1911.

JOHN W. LATIMER, OF CHICAGO, ILLINOIS, ASSIGNOR TO INTERNATIONAL HARVESTER COMPANY, A CORPORATION OF NEW JERSEY.

HAY-RAKE.

1,009,156.  Specification of Letters Patent.  Patented Nov. 21, 1911.

Application filed July 3, 1911. Serial No. 636,570.

*To all whom it may concern:*

Be it known that I, JOHN W. LATIMER, a citizen of the United States, residing at Chicago, in the county of Cook and State of Illinois, have invented certain new and useful Improvements in Hay-Rakes, of which the following is a specification.

My invention relates to hay rakes of the self-dump type, and in particular to means for tripping the clutch mechanism into operative relation with the traction wheels, whereby the rake teeth are carried to a dumping position, and it consists in a novel construction of parts associated with a common form of rock shaft having pawls at opposite ends thereof adapted to engage with ratchet teeth upon the hubs of the traction wheels, whereby the rock shaft may be rocked in its bearings upon the rake head; the object of my invention being to provide a tripping mechanism that will be reliable and efficient in operation, comprising few parts and one that may be easily and quickly assembled. I attain these objects by means of the mechanism illustrated by the accompanying drawings, in which—

Figure 1 represents an end elevation of a rake head in section and parts of the draft frame connected therewith and one of the wheels and having my improved tripping mechanism forming a part thereof; Fig. 2 is a top plan view of an enlarged scale of part of Fig. 1; Fig. 3 is a detached detail, partly in section, and designed to illustrate the operation of the tripping mechanism; Fig. 4 is a detached detail on an enlarged scale of part of the tripping mechanism; Fig. 5 is a sectional detail of part of Fig. 2; and Fig. 6 is a detail of part of one of the wheel hubs and designed to illustrate the manner of clutching the wheels with the pawl carrying rock shaft forming part of the rake dumping mechanism.

The same reference characters designate like parts throughout the several views.

1 represents the rake head, 2 one of the stub axles that are commonly secured to opposite ends of the rake head in various ways, 3 a wheel hub journaled upon the axle and provided with an inwardly projecting rim portion 4 having internal ratchet teeth 5 formed thereon; 6 represents the rake teeth, that may be secured to the head in any desired manner; 7 represents the draft frame, pivotally connected with the rake head, and 8 an operator's seat carried by the draft frame; 9 represents a divided rock shaft having its middle portion mounted in bearings 10 secured to the rake head and its opposite ends in plate members 11 secured to the rake head adjacent to the inwardly projecting rim portions of the wheel hubs in a well-known way. The rock shaft is provided at opposite ends thereof with laterally turned portions 12 that are operative as pawl members to engage with the ratchet teeth upon the wheel hubs when the shaft is rocked in a direction to dump the load, and at the inner ends of each section of the shaft with similar laterally turned portions 13 that permits an interchanging of sections or a reversal of their position upon the rake head in a well-known manner.

14 represents a bracket member secured to the middle portion of the rake head by means of bolts 15, and having a barrel portion 16 at its front side that is arranged parallel with the rake head.

17 represents a rocking yoke having depending ear portions 18 at its lower side that are spaced apart in a manner to receive between them the barrel portion 16 of the bracket 14, to which the ears are pivotally connected coaxially with the rock shaft by means of a pin 19. The yoke is provided with a web portion 20 arranged concentric with the axis of pin 19 and laterally turned fork members 21 oppositely disposed and adapted to receive the laterally turned inner ends of adjacent sections of the rock shaft 9 in a manner to cause the latter to rock with the yoke.

22 represents a lever that is pivotally mounted intermediate its ends upon one end of the pin 19 coaxially with the rocking yoke and having its lower end pivotally connected with the rear upturned end of a link 23, the front end of said link being pivotally connected with the lower end of a rocking foot lever 24 that is pivotally connected intermediate its ends with the draft frame. The upper end of lever 22 extends through the slotted opening 25 in the web portion of the yoke, the opposite walls of the slotted opening being provided with a series of laterally arranged openings, and 26 represents a pin that may be inserted in either pair of openings in the walls and through an opening in the lever, whereby the position of the lever may be adjusted relative to the rocking yoke.

27 represents a rearwardly and upwardly inclined sector integral with the bracket 14 and having its upper end concentric with the axis of pin 19 and provided with depressions 28, the upper end of the sector being received by a slotted opening 29 in the web of the yoke.

30 represents a radially arranged barrel integral with the yoke and arranged at the rear end of the slot 29, the barrel being provided with oppositely disposed slotted openings in its wall adapted to receive a pin 31, the middle portion of the pin engaging with the depressions 28 in the sector as the yoke is rocked about its axis.

32 represents a cylindrical plunger slidably received by the barrel 30 and having a saddle portion at its lower end that partially embraces the pin 31, and 33 represents a compression spring operative between the end wall of the barrel and the upper end of the plunger in a manner to yieldingly hold the pin 31 in engagement with the sector.

When the rake is in raking position the associated parts of the tripping mechanism are in the position shown by full lines in Fig. 1 and the pawl members at opposite ends of the rock shaft are in the position as shown by full lines in Fig. 6, and the rocking yoke is in its rearward position with the cross pin 31 seated in the rear depression in the sector 27, as shown by full lines in Fig. 5, whereby the rock shaft is yieldingly held against a premature rocking movement. When it is desired to dump the load the operator presses forward upon the foot lever 24, which, through its connection with lever 22, will cause the latter to rock about its pivot and to carry with it the rocking yoke 17 and rock shaft 9 in a manner to cause the pawl members at opposite ends of the rock shaft to engage with the ratchet teeth of the wheel hubs, as shown by dotted lines in Fig. 6, the yoke and rock shaft being yieldingly held in a tripped position by means of pin 31 engaging with the forward depression in the sector 27, as shown by dotted lines in Fig. 5. When the rake head is drawn forward to the limit of its movement in dumping the load, the upper end of lever 22 contacts with the draft frame in a manner to rock the yoke and rock shaft in a reverse direction in a manner to disengage the pawls from the ratchet teeth upon the wheel hubs and permit the head to rock rearward and carry the rake teeth to a raking position, the position of the parts at the time of contact between lever 22 and the draft frame being controlled by the adjustment lever 22 with the yoke by means of the pin 26 that may be inserted in either of the series of openings in the yoke, as shown in Fig. 3.

What I claim as my invention, and desire to secure by Letters Patent, is:

1. A hay rake including, in combination, carrying wheels, a rake head adapted to rock about the axis of said carrying wheels, a draft frame, a rock shaft journaled in bearings carried by said head and having pawl members at opposite ends thereof that are adapted to engage with the hubs of the carrying wheels in a manner to cause said rake head to turn with said carrying wheels, said rock shaft including a rocking yoke connected with the middle portion of said rock shaft and pivotally connected with said head coaxially therewith, means for rocking said yoke, said means including a depending lever pivotally connected with said head coaxially with said yoke, said lever having one end thereof adjustably connected with said yoke, a foot lever pivotally mounted upon said draft frame, and a link connection between said foot lever and the opposite end of said depending lever.

2. A hay rake including, in combination, carrying wheels, a draft frame, a rake head adapted to rock about the axis of said carrying wheels, a rock shaft comprising two sections journaled coaxially in bearings carried by said head and having pawl members at opposite ends of each section, the pawl members at opposite ends of the shaft being adapted to engage with the hubs of the carrying wheels in a manner to cause said rake head to turn with said carrying wheels, a rocking yoke pivotally connected with said head coaxially with said rock shaft and having oppositely disposed forked members that receive the pawl members upon the adjacent inner ends of the two sections of said rock shaft, a sector secured to said head and arranged concentric with the axis of said yoke and provided with depressions upon its concentric portion, a spring-pressed plunger carried by said yoke and adapted to engage with said depressions when said yoke is rocked about its axis, means for rocking said yoke in one direction, said means including a depending lever pivotally connected with said head coaxially with said yoke and having one end thereof adjustably connected with said yoke, a foot lever pivotally mounted upon said draft frame, a link connection between said foot lever and the opposite end of said depending lever, the upper end of said depending lever being adapted to contact with said draft frame when said head has nearly reached the forward limit of its movement in dumping the load in a manner to rock said yoke in an opposite direction.

3. A hay rake including, in combination, carrying wheels, a draft frame, a rake head adapted to rock about the axis of said carrying wheels, a rock shaft comprising two sections journaled coaxially in bearings carried by said head and having laterally turned pawl members at opposite ends of each section, the pawl members at opposite ends of the shaft being adapted to engage with the hubs of the carrying wheels in a manner to cause said rake head to turn with said carrying wheels, a bracket secured to the middle portion of said head, said bracket being provided with a barrel portion having an axial opening therethrough in alinement with the axis of said rock shaft, a rearwardly and upwardly inclined sector integral with said bracket and concentric with the axial opening in said barrel portion and provided with depressions upon its concentric portion, a rocking yoke including depending ear portions pivotally connected with the barrel portion of said bracket, a web portion concentric with the axis of the yoke, oppositely disposed forked members that receive the pawl members upon the adjacent inner ends of the two sections of said rock shaft, a slotted opening in the web portion of the yoke adapted to receive the upper end of said sector, a spring-pressed plunger carried by the yoke and engaging with depressions in said sector, means for rocking said yoke in one direction, said means including a depending lever pivotally connected intermediate its ends with said bracket coaxially with said yoke, said lever having one end adjustably connected with said yoke, a foot lever pivotally mounted upon said draft frame, a link connection between said foot lever and the opposite end of said depending lever, the upper end of said depending lever being adapted to contact with said draft frame when said head has nearly reached the forward limit of its movement in dumping the load in a manner to rock said yoke in an opposite direction.

JOHN W. LATIMER.

Witnesses:
WILLIAM CLARK,
C. S. ADAMS.

---

Copies of this patent may be obtained for five cents each, by addressing the "Commissioner of Patents, Washington, D. C."